United States Patent [19]

Redford

[11] 4,124,072

[45] Nov. 7, 1978

[54] VISCOUS OIL RECOVERY METHOD

[75] Inventor: David A. Redford, Fort Saskatchewan, Canada

[73] Assignee: Texaco Exploration Canada Ltd., Canada

[21] Appl. No.: 864,995

[22] Filed: Dec. 27, 1977

[51] Int. Cl.$^2$ .................. E21B 43/22; E21B 43/24
[52] U.S. Cl. ...................... 166/270; 166/263; 166/271; 166/272; 166/281; 166/273
[58] Field of Search .............. 166/263, 270, 271, 272, 166/273, 281, 292

[56] References Cited

U.S. PATENT DOCUMENTS

| | | | |
|---|---|---|---|
| 2,747,670 | 5/1956 | King et al. | 166/270 |
| 3,221,813 | 12/1965 | Closmann et al. | 166/271 |
| 3,343,600 | 9/1967 | Phansalkar et al. | 166/281 |
| 3,375,870 | 4/1968 | Satter et al. | 166/271 X |
| 3,459,265 | 8/1969 | Buxton et al. | 166/272 X |
| 3,827,495 | 8/1974 | Reed | 166/281 X |
| 3,854,538 | 12/1974 | Suman, Jr. et al. | 166/292 X |
| 3,908,762 | 9/1975 | Redford | 166/263 |
| 3,913,672 | 10/1975 | Allen et al. | 166/263 |
| 3,983,939 | 10/1976 | Brown et al. | 166/272 X |
| 4,007,785 | 2/1977 | Allen et al. | 166/263 |

*Primary Examiner*—Stephen J. Novosad
*Assistant Examiner*—George A. Suchfield
*Attorney, Agent, or Firm*—Carl G. Ries; Thomas H. Whaley; Jack H. Park

[57] ABSTRACT

Disclosed is method for treating a high permeabiity communication channel between wells for use in a viscous oil recovery method to stabilize fine particulate matter present in the communication channel to prevent movement of fine particles during the oil recovery process. The communication channel is formed by fracturing or sweeping with air followed by introducing a viscous oil displacing medium such as a solvent or steam to desaturate the previously fractured or air swept zone in the formation, converting it into a high permeability channel between wells. In order to stabilize the fine grain sand and other minerals present in the communication channel to prevent migration thereof which results in loss of permeability of the communication channel, the channel is treated with a hydroxy aluminum solution and allowed to age for a period of time sufficient to form crystalline aluminum hydroxide which cements the grains together while maintaining permeability of the communication channel. Thereafter the primary oil recovery fluid, such as steam, may be injected through the stabilized, high permeability communication channel for long periods of time sufficient to heat the portions of the oil saturated formation above or below the channel, and strip viscous petroleum therefrom, so a substantial amount of the oil present within the pattern being subjected to the oil recovery process may be recovered.

9 Claims, No Drawings

VISCOUS OIL RECOVERY METHOD

FIELD, BACKGROUND AND PRIOR ART

Field of the Invention

This invention concerns a method for recovering viscous petroleum. More specifically, this invention concerns a method for forming a stabilized, high permeability communication path between spaced-apart wells completed in a subterranean, viscous petroleum-containing formation, whereby steam or other oil displacing fluids may be injected into the stabilized, high permeability communication path for long periods of time without the danger of losing permeability in the path due to the migration of unconsolidated fine sand or other mineral particulate matter in the path.

BACKGROUND OF THE INVENTION

There are many subterranean formations which contain vast quantities of petroleum, but little or no petroleum can be recovered from these formations by so called primary production methods because the petroleum viscosity is so high that it will not move through the formation even if a pressure gradient is applied across a portion of the formation. The most extreme example of such formations are the so called oil sand or tar sand deposits such as those found in the western United States, in Alberta Canada, Colombia and lesser deposits in Europe and Asia. Tar sands are generally described as deposits of relatively unconsolidated sand which are usually in grain-to-grain contact, with a substantial portion of the void space between sand grains being saturated with a viscous, highly bituminous petroleum. The viscosity of the bituminous petroleum found in the Athabasca tar sand, for example, is in the range of several million centipoise at normal formation temperatures, which is about 40° F. (4.4° C.).

Many techniques have been described in the literature for recovering viscous petroleum from such formations. Many methods described in the art entail the injection of steam or mixtures of steam and other substances including sodium hydroxide or other alkalinity agents, mixtures of steam and hydrocarbon, or mixtures of steam and air. Most of these methods require the prior treatment of the formation by some method calculated to produce a high permeability, stable communication path between one or more injection wells and one or more production wells. Ideally the communication path is located near the bottom of the oil formation, and may represent only 5 or 10 percent of the total vertical thickness of the formation. Because the volume of formation treated is very much less than the total volume of the formation from which oil is to be recovered, it is economically feasible to apply treating processes to form the communication paths which could not be economically applied to the entire formation. For example, the formation may first be fractured or treated by injecting air, followed by injecting a solvent into the formation to dissolve and displace viscous petroleum from the portions of the formation in which a communication path is to be established. Steam may also be utilized in the stage of forming the communication path.

A problem common to the formation and employment of communication paths in tar sand deposits is associated with the unconsolidated character of the granular mineral substances present in the formation. The viscous bituminous petroleum originally present is the primary cementing agent maintaining the formation integrity, and after it has been removed for the purpose of forming a communication path, further passage of fluid through that portion of the formation results in displacement and migration of fine particulate matter in the direction of fluid flow. Ultimately the fine granular substances form packs or blockages within the formation which reduces the permeability of the communication path and prevents further injection of fluids therethrough. Loss of permeability due to accumulation of fine material particles that have been displaced by fluid injection is extremely difficult and sometimes impossible to reverse, and so a method of preventing such migration is needed to ensure success of any viscous oil recovery method applicable to tar sand deposits or other such formations in which the oil recovery process employs a communication path.

DESCRIPTION OF THE PRIOR ART

The use of an aqueous hydroxy aluminum solution for treating clay-containing formations in near well bore processes is described in a technical paper entitled "Field Results of Wells Treated with Hydroxy Aluminum" by C. P. Coppel, H. Y. Jennings, Jr. and M. G. Reed, presented at the Society of Petroleum Engineers of the AIME 47th Annual Meeting, Oct. 8-11, 1972, SPE Paper 398. Another discussion is found in a technical paper published in the July, 1972 issue of the Journal of Petroleum Technology entitled "Stabilization of Formation Clays with Hydroxy Aluminum Solution" by M. G. Reed. Finally, SPE Paper 4186 entitled "Sand Stabilization with Hydroxy Aluminum Solutions" by M. G. Reed and C. P. Coppel, presented at the 43rd Annual Meeting of the Society of Petroleum Engineers of AIME on Nov. 8-10, 1972, again is concerned with near well bore treatment of formations containing sand and small amounts of clay for stabilization purposes.

SUMMARY OF THE INVENTION

My invention concerns a method of forming a stabilized communication path in a subterranean, viscous oil-containing formation which also contains unconsolidated sand and other granular mineral materials, so large amounts of the primary oil recovery fluid, generally steam or a mixture of steam and other suitable substances, may be injected into the high permeability communication path over long periods of time without the danger of loss of fluid injectivity or transmissibility due to migration of fine grain sand or other mineral particles in the communication path which ultimately accumulate and form a blockage. The communication path may be formed by any method well known in the art, but generally requires an initial treatment to establish permeability within the formation such as fracturing and/or air sweeping, after which the oil saturation in that portion of the formation is reduced by injecting a solvent or steam or a mixture of steam and other materials into the pretreated zone to decrease the oil saturation, thereby increasing the permeability of the communication channel. The treatment is ordinarily continued until essentially all of the petroleum in that portion of the formation which is to constitute the communication path, has been recovered. It is at this stage that the stabilizing fluid is injected into the formation, which comprises an aqueous solution of hydroxy aluminum, preferably containing from 1 to 2 percent by weight of aluminum and from 1.5 to 3 percent by weight of hydroxy, and with the ratio of hydroxy to aluminum being from about 1.5 to about 2.5. This ensures the presence of a six member hexamer having a +6 valence which readily adsorbs onto any negatively charged surface such as clay or sand grains. Sufficient fluid is injected to contact the formation sand grains in the portion of the formations where the communication path has been formed, at least a substantial distance from each well. Preferably, sufficient fluid is injected to completely saturate substantially all of the portion of the formation which has been depleted for the purpose of forming the communication path, so all of the sand grains present therein will be bonded together forming a continuous, stable communication path through which steam may be injected over long periods of time without the danger of losing steam injectivity due to migration of fine sand or other mineral particles. After the desired amount of fluid has been injected, the solution should be left in contact with the sand grains for a sufficient period of time for the crystallization of aluminum hydroxide to occur, which accomplishes the bridging between sand particles. Ordinarily from 2 to 15 days and preferably from 5 to 10 days is a satisfactory curing time for this purpose. The aluminum hydroxy solution may then be displaced from the communication path and the primary oil recovery process applied by injecting steam or a mixture of steam and other fluids into the stabilized communication path for the purpose of recovering oil therefrom.

DESCRIPTION OF THE PREFERRED EMBODIMENTS

My process comprises a method of forming a stable, high permeability communication path in a subterranean, viscous oil-containing formation which will permit injection of steam or a mixture of steam and other substances into the communication path over very long periods of time, such that large numbers of pore volumes of steam are injected on the basis of the pore volume of the communication path itself, without the danger of causing migration of uncemented, fine grain sand or other granular mineral particles within the communication path in the direction of fluid flow. Particulate matter migration, if not restrained, ultimately results in the fine particles bridging and forming a blockage in the communication path which prevents further injection of the recovery fluid thereinto and further prevents flow of heated viscous petroleum through the communication path. Blockages formed from particulate matter is very difficult or impossible to correct.

The formation for which the process of my invention is intended will ordinarily be a subterranean tar sand deposit, which is located so deep that strip mining is uneconomical and so some form of in situ separation process must be applied. In situ separation of bitumen from such formations ordinarily requires the establishment of a communication path, preferably near the bottom of the formation. Steam is injected into the communication path and flows therethrough over long periods of time.

Whenever possible, it is preferred that the communication path be located at or near the bottom of the viscous oil saturated formation. It has been found that it is easier to strip petroleum from the portion of the formation above the communication path than to strip viscous petroleum from below the path. Flow of heat and/or solvents upward into the viscous oil saturated interval occurs spontaneously, and encourages gravity drainage of the viscous petroleum downward into the communication path. Once the heated viscous petroleum has moved into the communication path, it is displaced therethrough by the primary injection fluid to the producing well, where it is recovered to the surface of the earth.

The formation of the communication path at the desired location within the formation may be accomplished in a number of ways. The formation may first be fractured at the desired depth with fluid injection at about the same depth. The fluid injection point may be confined to the bottom portion of the formation, which induces the fluids injected into the formation for the purpose of forming the communication path to enter the formation at a point near the bottom of the formation, thus inducing the communication path to be initiated near the bottom of the formation. As the communication path development phase proceeds, the injected fluids tend to follow the shortest path between wells and so will tend to stay more or less in the bottom portions of the formation.

The first step in forming the communication path usually involves fracturing, and the point where the fracture fluid is injected into the formation under high pressures can easily be controlled by the use of mechanical devices which are well known in the art of oil well treating. Enlargement of the fracture into the desired communication then proceeds at about the same depth in the formation, and so establishes the path at the desired location.

It has been found and it is reported in the literature, that preliminary injection of air into the formation and for a period of time sufficient to sweep a portion of the formation will permit injection of steam or other fluids into the formation for the purpose of reducing petroleum saturation, thereby forming the communication path, under circumstances where the recovery fluid could not otherwise be injected into the formation but for the preliminary air sweep.

Ordinarily steam is a preferred material for reducing the oil saturation in the portion of the formation where the communication path is to be formed. This can sometimes be done from the beginning in a throughput well to well process, although it is sometimes necessary to alternately inject into and recover petroleum from the same well, after which a push-pull sequence is applied to a spaced apart well, with cyclical push-pull processes applied until the zone of reduced oil saturation adjacent the two wells are enlarged to the point where well to well communication can be established. Once well to well communication has been established, it is ordinarily more satisfactory to inject steam or other fluids into the formation for the purpose of displacing petroleum through the zone of the formation toward the production well in a continuous throughput fashion until sufficient oil has been recovered to establish a high permeability channel between the wells. There is a strong asymmetrical nature to the path thus formed, with substantially oil depletion vertical and horizonal extent of completion around the injection well than around the production well. Accordingly, one preferred method of utilizing the process of my invention involves injecting into a first well and producing from the second well until the communication path has been formed, after which the stabilization process to be described hereinafter below is applied to the communication path, after which the primary injection fluid is injected into the second well and oil is recovered from the first well, so fluid flow is in the direction opposite to that employed initially, for the purpose of ensuring that oil recovery is taken from the portion of the formation where the communication path is largest in both the vertical and horizontal direction, to reduce the problems associated with plugging of the communication path during the oil recovery phase.

Once the above described process has been completed, the following stabilization process is applied to the previously formed high permeability channel.

Basically, the stabilization phase according to the process of my invention involves injecting an aqueous solution of hydroxy aluminum. The solution may be prepared for field use by mixing from 5 to 10 percent by weight aluminum chloride and from 3.5 to 7 percent by weight sodium hydroxide in water and mixing in a high shear mixer. The hydroxy/aluminum ratio should be from 1.5 to 2.5 and preferably around 2, as this ratio encourages the formation of a solution of hydroxy alumina six members units (hexamers) having a +6 valence, which are very tightly adsorbed on negatively charged formation surfaces. Once adsorbed onto clay surfaces particularly, the hydroxy aluminum is virtually non-exchangeable.

After injecting above described hydroxy alumina solution, the solution should be left in the formation for an aging period in which no injection into the formation occurs, which provides sufficient time for the hydroxy alumina to form crystalline sheets of aluminum hydroxide which is the cementing medium that binds the mineral particles together.

The above described solution may be injected into either well and flowed through the communication channel until it is produced at the other well, thus ensuring saturation of a substantial portion of the high permeability channel between the wells. It is preferable that virtually all of the communication channel be saturated with the stabilizing fluid if economically feasible, although in some cases it is sufficient to treat only that portion of the communication channel adjacent to both wells to minimize fine particle migration in the areas where fluid flow rates will be greatest.

The reaction relief on for the purpose of cementing the fine particles together is especially effective with respect to clay particles. The formation should contain a minimum of about one percent clay for the above described process to be applied effectively without other treatment. While the sand particles are cemented by this process, the presence of clay is necessary to ensure the effective crystallization reaction.

If it is determined that the clay content of the formation is not sufficient to permit the above described process to be applied directly, a slightly different additional procedure is called for. A small amount of a highly reactive clay such as sodium montmorillonite may be introduced into the communication channel. Care should be taken to ensure that the method of introducing the montmorillonite does not result in the formation of a clay filter cake at or near the point of fluid injection. This may be accomplished by dispersing the montmorillonite clay in a brine or other high electrolite-containing aqueous fluid which prevents swelling of the montmorillonite. After the montmorillonite-in-brine fluid has been introduced into the formation, it may be displaced by the hydroxy alumina treatment solution. Sufficient clay particles remain in the formation to ensure the presence of a minimum amount of clay necessary for a cementing reaction to occur. If the salinity of the brine is at least 100,000 parts per million, from 0.5 to 5.0 percent by weight montmorillonite may be employed therein, depending on the permeability of the communication path into which the fluid is being introduced. Sufficient clay-containing fluids could be introduced to ensure that substantially all of the volume of the communication channel in which the cementing reaction is to occur, is contacted with the clay-containing fluid.

In a slightly different embodiment, which is especially applicable to process in which solvents are employed in the course of forming the communication channel, the montmorillonite may be dispersed and suspended in the solvents. Montmorillonite does not yield or hydrate in hydrocarbon solvents, and so may safely be dispersed therein and injected into the communication channel without the danger of forming the filter cake which prevents uniform passage of clay particles throughout the communication channel. In the use of hydrocarbon solvents, from 0.5 to 10 percent by weight clay particles may be dispersed therein. The particle size of the clay utilized in the foregoing process should be quite fine, and a high shear mixer may be utilized to ensure that particle size of clay dispersed in the fluid is sufficiently low to permit its passage through the pore channels of the communication channel without danger of plugging.

For the purpose of additional disclosure, further illustrating the method of employing the process of my invention, as well as illustrating the nature and magnitude of results obtainable therefrom, the following examples are offered.

In the following examples, a laboratory cell measuring approximately 8 inches in diameter and 8 inches in height is packed with tar sand materials obtained from a surface mining operation in Alberta, Canada to a density equivalent to the density of tar sand materials present in subterranean formations. The cell is equipped with two wells, one for injection of fluid and one for production of petroleum and other fluids from the well. No communication path is provided in packing the well, since the object of the tests is to study processes for forming and stabilizing the communication part to be utilized in subsequent evaluation of steam flooding oil recovery processes.

EXAMPLE I

Air is injected into the injection well at a rate of 25 standard cubic feet of air per hour for 24 hours, to ensure that an air swept zone is formed between the injection well and production well within the cell. A commercially available naphtha is thereafter introduced into the injection well and fluids are recovered from the production well for 4 hours. The injection-production roles are thereafter reversed, it being desired to utilize the well employed for fluid injection in the communication path formation stage, as the production well in the primary oil recovery process, in order to take advantage of the fact that the communication path is larger in both the horizontal and vertical direction around the well employed for fluid injection during the communication path formulation stage, than it is in the vicinity of the well employed for the production well during the same communication path forming stage. The oil recovery process to be studied involves injecting 90 percent quality steam at 500 pounds per square inch and 471° F., there being mixed with the steam approximately 3 percent by weight of the commercially available naphtha.

Oil recovery and fluid injection are monitored on a timed basis in order to determine the oil recovery as a function of pore volumes of steam injected. The oil recovery phase is continued until 8 pore volumes of steam are injected into the cell, based on the total pore volume of the entire cell. Because the pore volume of the portion of the cell in which the communication path was formed only represents about 5 percent of the total volume of the cell, this is in effect equivalent to 160 pore volumes of steam on the basis of the volume of the communication path itself. This emphasizes the great need for stability of the communication path. While the total oil recovery increases with the pore volumes of steam injected, it is observed that the injectivity into the cell is decreased by approximately 45 percent over the period of time required for injection of 8 pore volumes of steam into the cell.

After completion of the above described run, the cell is carefully examined, and samples of sand in the communication path at various points between the injection well and the production well are examined carefully, and it is determined that fine particles migration has occurred within the communication path to a degree sufficient to reduce the rate at which fluid flow through the path can be accomplished.

EXAMPLE II

A second run essentially identical to that described above is performed, except that after the communication path formulation stage, a solution of hydroxy aluminum is introduced into the path to stabilize the sand particles therein. The hydroxy aluminum solution is prepared by dissolving 5 grams of aluminum chloride and 3.5 grams of sodium hydroxide and 92.5 milliliters of distilled water and shearing for 90 minutes on a high shear laboratory mixer. This fluid is introduced into the communication path by injecting it thereinto via the same well as is used as an injection well in the communication path formulation stage, until hydroxy aluminum solution flows from the cell via the production well. This ensures that the entire communication path within the cell is saturated with hydroxy aluminum. Both wells are then shut in and the fluid is allowed to remain in the communication path within the cell for 6 days, which permits the crystallization necessary to accomplish the desired cementing between the sand grains to occur.

In the ensuing oil recovery phase, it is determined that the injectivity only decreases lens than 10 percent during the period of time required for injection of 8 pore volumes of steam. This clearly establishes the effect of hydroxy aluminum for reducing the migration of sand particles within the communication path during the subsequent oil recovery process.

EXAMPLE III

The above described tar sand material is analyzed and found to contain 1.2 percent by weight clay. This is only marginally sufficient to ensure the presence of an adequate amount of clay to achieve the maximum obtainable cementing between adjacent sand grains. Accordingly a third experiment is performed, essentially identical to Experiment II, except that prior to the injection of hydroxy aluminum solution into the communication path, an additional treatment is applied for the purpose of introducing additional clay into the communication path to assist in the cementing reaction.

The additional clay utilized is a high grade Wyoming bentonite, which is relatively pure sodium montmorillonite. A fluid is prepared by dissolving 10 percent by weight of this sodium montmorillonite clay in hexane, and mixing the fluid thoroughly to ensure complete dispersion of the clay in the hexane. This fluid is then introduced into the communication path by injecting it into the injection well until the fluid is produced from the production well, thus ensuring saturation of the communication path. This process will incidentally further decrease the oil saturation within the communication path and a portion of the tar sand material adjacent thereto, thus increasing the flow capacity of the communication path. The hexane is removed from the cell by injecting dry nitrogen into the injection well, which displaces and partially evaporates the hydrocarbon carrier, thus leaving sufficient clay particles in the communication path to permit their entering into the cementing reaction accomplished by introduction of the hydroxy aluminum solution into the communication path. After flow of hexane from the production well ends, the hydroxy aluminum solution is introduced into the communication path and the run otherwise proceeds as is discussed above in experiment II.

It is observed that the initial injectivity of the communication path is somewhat higher than in runs 1 or 2, as is expected, and furthermore the decrease in injectivity is only 6 percent, clearly indicating that the introduction of clay into the communication path prior to the treatment with hydroxy alumina solution increases the cementing reaction, thereby more efficiently binding the sand particles together in the communication path.

While my invention has been described in the terms of a number of specific illustrative embodiments, it should be understood that it is not so limited since numerous variations of the processes described herein will be apparent to persons skilled in the related art without departing from the true spirit and scope of my invention. Furthermore, while reactions and mechanisms have been discussed for the purpose of explaining the benefits achieved by application of the process of my invention, it is not my desire to be bound or restricted to any particular explanation for the benefits achieved through application of the process of my invention. It is my desire and intention that my invention be limited and restricted only by those limitations contained in the claims appended immediately hereinafter below.

I claim:

1. In a method of recovering viscous petroleum from a subterranean, viscous petroleum-containing formation, said formation being penetrated by at least one injection well and by at least one production well in fluid communication with the formation, comprising the steps of forming a communication path between the injection well and the production well having a permeability substantially greater than the permeability of the oil formation, and introducing a viscous oil recovery fluid comprising steam into the formation via the injection well to pass through the communication path, mobilizing viscous petroleum and displacing it through the communication path toward the production well, wherein the improvement for stabilizing the communication path to prevent migration of fine mineral particles therein comprises (a) introducing an aqueous fluid containing aluminum ions and hydroxy ions into the communication path in an amount sufficient to saturate substantially all of the communication path;

(b) allowing the aqueous solution containing aluminum ions and hydroxy ions to remain in the communication path for a period of time sufficient to ensure cementing of a substantial portion of the sand grains together;

(c) displacing the aqueous fluid containing aluminum and hydroxy ions from the communication path with a suitable fluid; and (d) thereafter introducing the primary viscous oil recovery fluid into the stabilized communication path.

2. A method as recited in claim 1 wherein the ratio of hydroxy to aluminum ions in the aqueous fluid is from 1.5 to 2.5.

3. A method as recited in claim 1 wherein the aqueous fluid containing aluminum ions and hydroxy ions is a solution formed by blending aluminum chloride and sodium hydroxide in water and a high shear rate.

4. A method as recited in claim 1 wherein the aqueous fluid containing aluminum and hydroxy ions is allowed to remain in the communication path for a period of time of from about 1 to about 50 days to ensure complete cementing.

5. A method as recited in claim 1 comprising the additional step of introducing a fluid containing clay particles into the communication path prior to the step of introducing the aqueous fluid containing aluminum ions and hydroxy ions thereinto.

6. A method as recited in claim 5 wherein the clay is sodium montmorillonite.

7. A method as recited in claim 5 wherein the fluid comprises an aqueous solution of electrolyte including sodium chloride in a concentration sufficient to prevent hydration of the clay.

8. A method as recited in claim 5 wherein the fluid is a hydrocarbon having from 5 to 12 carbon atoms.

9. A method as recited in claim 8 comprising the additional step of injecting a gas into the communication path to displace the clay-containing fluid and evaporate at least a portion of the hydrocarbon.

* * * * *